United States Patent Office 3,420,629
Patented Jan. 7, 1969

3,420,629
PRODUCTION OF BORON NITRIDE
Eugenio Lubatti, Turin, and Salvatore Pappalardo, Novara, Italy, asisgnors to Montecatini Edison S.p.A., Milan, Italy, a corporation of Italy
No Drawing. Filed Apr. 12, 1966, Ser. No. 541,953
Claims priority, application Italy, Apr. 13, 1965, 8,193/65; June 22, 1965, 13,949/65
U.S. Cl. 23—191
Int. Cl. C01b *21/06*
8 Claims

ABSTRACT OF THE DISCLOSURE

Described is a process for producing boron nitride. A boron-containing substance selected from the group consisting of boric acid, boric anhydride and hydrated borate is mixed with recycled boron nitride from a subsequent step. The mixture is heated to drive off water when using boric acid or hydrated borate. It is then finely ground when using boric acid or boric anhydride. Thereafter the mixture is nitrided by heating in a stream of ammonia to form boron nitride. The boron nitride produced is ground and part of the ground boron nitride is recycled to a previous step and the remainder is purified.

Our invention relates to production of boron nitride. We provide a process for producing boron nitride in which boric acid, boric anhydride or a borate is mixed with crude recycled boron nitride and subsequently nitrided.

In greater detail, we provide a process in which the boric acid, boric anhydride or a borate is mixed with crude recycled boron nitride. The mixture is heated to drive off water, if boric acid or a hydrated borate is being used and ground very finely, if boric acid or boric anhydride is being used. The mixture is subsequently nitrided by heating in a stream of ammonia to form crude boron nitride which in turn is ground, and divided into two parts, one of which is recycled and the other purified.

When boric acid or boric anhydride is being used, the mixture is ground to give a particle size of 40μ or less and an apparent density of 0.5 g./cc. or less. The nitriding stage is carried out at a temperature from 600 to 1000° C. and preferably 750° C. When a borate is being used, the nitriding temperature is from 800 to 1200° C., and preferably 1000° C. A preferred range of ratios by weight of borate to crude boron nitride is from 1:1 to 1:03, the best ratio being about 1:0.5. When boric acid or a hydrated borate is used, the water should be driven off after mixing with the crude nitride, preferably at 300° C. to 400° C.

Where boric acid or boric anhydride is used, the crude boron nitride produced may be purified according to an important feature of the present invention by being ground, heated in nitrogen, preferably from 1250° to 1300° C., and then nitrided, preferably after grinding as before and at the temperatures used in the first nitriding step. Alternatively, the residual boric anhydride, which is rendered active by the heating in nitrogen, can be leached out. Where a borate is used, the crude nitride may be purified by grinding, preferably to a particle size less than 0.1 mm., followed by leaching.

According to another feature of this invention, there is a final purification, by heating in nitrogen, preferably in the range 1600° to 2000° C. and most preferably at 1800° C.

The following are more detailed explanations of two processes of this invention.

In the first process, the following operations are carried out:

Boric acid is mixed with a raw boron nitride support in a weight ratio of 1 part of boric acid per 1.1 part of raw nitride. The boric acid, which is preferably of the granular type with a particle size less than 0.15 mm., should be as pure as possible, and preferably at least 99.5% pure. The raw boron nitride of the mixture has a purity about or somewhat above 75% and is the product of the first nitridation described below, having been recycled after grinding in a hammer mill.

The mixture of boric acid and raw nitride support are pretreated in a furnace at a temperature of 300–400° C., in order to transform the acid into boric anhydride.

The pretreated mixture is crushed and coarsely ground to a particle size lower than 0.1 mm.

The coarsely ground pretreated mixture is very finely ground to a particle size less than 40μ to obtain a powdery mass with an apparent density as low as possible, and preferably 0.5 g./cc. or less. This treatment gives such physical characteristics to raw boron nitride as to make it very suitable for use as the support, thus avoiding the decrease of yield and purity that occurs when raw boron nitride, as it is, is used as the support for boric anhydride.

The powder is nitrided in a furnace, under a current of gaseous ammonia, at a temperature of 600–1000° C., preferably at a temperature of 750° C. A product containing at least 65% and generally 75–80% of boron nitride, the residue being boric anhydride, is obtained. The nitrided product is crushed and coarsely ground to reduce the particle size to below 0.1 mm.

The ground raw nitride is treated in a furnace at a temperature of 1250–1300° C., under nitrogen. By this treatment the boric anhydride present with the nitride becomes reactive, whereby loss of boric anhydride is avoided.

The last product is very finely ground to obtain a powder of characteristics similar to those of the powder of the preheated mixture above.

The resulting product is nitrided by the method described in the first nitridation stage to give a product having a boron nitride content of about 95%, which can be directly used if desired.

The second nitridation product is calcined in a furnace at a temperature of 1600–2000° C., preferably 1800° C., under nitrogen. A purity of 99% or better is obtained.

In the second process, the following operations are carried out:

Sodium tetraborate decahydrate (borax) or other hydrate such as a calcium borate, or anhydrous borax, is mixed with a support of crude recycled boron nitride, in a weight ratio from 1:1 to 1:0.3 and, preferably, in a ratio such that, after the pretreatment below, the mixture appears to consist of 67% of the borate, $Na_2B_4O_7$, and 33% of boron nitride support, corresponding to a ratio of 1:0.5.

The mixture, is pretreated, when hydrated borax is used, in a furnace at a temperature of 300° to 400° C., to eliminate water.

The pretreated mixture is crushed and coarsely ground to give a particle size less than 0.1 mm.

Nitridation of the pretreated mixture (or the mixture without treatment when anhydrous borax is used) in a furnace under a stream of gaseous ammonia at the temperature of 1000° C., gives a product having the following composition:

| | Percent |
|---|---|
| BN | 47–63 |
| NaOH | 23–38 |
| Residual borate | 14–15 |

The nitrided product is crushed and coarsely ground to give a particle size of less than 0.1 mm.

The product is washed with water, filtered and dried at 80–100° C., to give a product containing more than 95% boron nitride.

The washed product is calcined in a furnace at a temperature of 1600 to 2000° C., preferably 1800° C., under nitrogen, to give boron nitride with a purity of 99%.

In the present invention, it is possible to produce boron nitride by using static or moving furnaces (rotating furnaces, tape furnaces or other types of furnaces) with either a discontinuous or continuous cycle.

The following examples are to illustrate the invention, without limiting the scope thereof:

EXAMPLE 1

3.1 kg. of boric acid having a purity of 99.5% were mixed with 3.5 kg. of raw 75% boron nitride. The mixture was treated in a furnace at 350° C. to completely transform the acid into boric anhydride. An agglomerate was obtained which was crushed and ground to obtain a powder having a particle size less than $40\mu$ and an apparent density of 0.47 g./cc. The powder was charged in a suitable furnace and heated to 750° C. under an ammonia stream, to give 4.67 kg. of raw 75% boron nitride. The raw nitride was ground to a particle size less than 0.1 mm.

One portion (3.5 kg.) of the ground product was recycled to the first nitridation stage while the remainder, 1.17 kg., was treated at 1300° C. under nitrogen and then ground to a particle below $40\mu$. The powder, which has an apparent density of 0.40 g./cc. was subjected to a second nitridation by the method employed in the first one.

1.05 kg. of 95% boron nitride were obtained which was calcined at 1800° C. under nitrogen to give 1 kg. of 99% pure material.

EXAMPLE 2

Raw 75% boron nitride was prepared as in the first steps of Example 1. A 3.5 kg. portion thereof was recycled.

The remaining portion 1.17 kg., was calcined at 1300° C., under nitrogen and then coarsely ground and washed with water acidified with hydrochloric or nitric acid in the presence of a suitable flocculating agent, e.g. Separan NP–10, a high molecular weight polymer of the amide of acrylic acid, produced by Dow Chemical Co., Midland, Mich. The suspension was filtered and dried giving boron nitride with a purity of 95%.

The second nitridation stage, illustrated in the preceding example, was thus avoided.

In order to obtain a product having a higher purity, the product was subjected to calcination at 1800° C. under nitrogen. A product having a purity of 99% was obtained.

EXAMPLE 3

3.790 kg. of borax (sodium tetraborate decahydrate) were mixed with 1 kg. of support material consisting of recycled raw boron nitride containing 47% boron nitride, 38% sodium hydroxide and 15% residual borate. The mixture was treated in a furnace at 400° C. to transform the decahydrate into the anhydrous salt. The agglomerate obtained was crushed and ground to give a powder of particle size less than 0.1 mm.

The powdered product was charged into a furnace and heated to 1000° C. under a stream of ammonia, 2.812 kg. of raw boron nitride having a purity of about 47% was obtained. This was ground to a particle size less than 0.1 mm. A 1 kg. portion was recycled and a 1.812 kg., portion was leached with warm water to give, after filtration and drying, 0.957 kg. of 98% boron nitride.

This product, calcined at 1800° C. under a stream of nitrogen gave 0.938 kg. of boron nitride with a purity greater than 99%.

We claim:

1. A process for producing boron nitride which sequentially comprises
   (a) mixing boric acid with crude recycled boron nitride from a subsequent step,
   (b) heating the mixture at a temperature of 300–400° C. to yield a heated mixture wherein the boric acid is transformed into boric anhydride,
   (c) crushing and coarsely grinding the heated mixture to a coarsely ground mixture with a particle size less than 0.1 mm.,
   (d) finely grinding the coarsely ground mixture to a powder with a particle size less than $40\mu$ to obtain a powdery mass with an apparent density of less than 0.5/cc.,
   (e) nitriding the powder in an ammonia current at a temperature of 600–1000° C. to form crude boron nitride,
   (f) crushing and grinding the crude boron nitride to a particle size less than 0.1 mm.,
   (g) recycling a portion of the ground crude boron nitride of (f) to (a),
   (h) heating under nitrogen the remaining portion of the ground crude boron nitride of (f) at a temperature of 1250–1300° C. to form boron nitride,
   (i) crushing and finely grinding the boron nitride of (h) to a powder with a particle size of less than $40\mu$ to obtain a powdery mass with an apparent density of less than 0.5 g./cc., and
   (j) nitriding the powder of (i) as in (e) to give a 95% boron nitride product.

2. The process of claim 1, wherein the product of (j) is calcined in a furnace at a temperature of 1600–2000° C. to give a 99% boron nitride product.

3. The process of claim 2, wherein the calcining temperature is 1800° C. and a nitrogen atmosphere is used.

4. The process of claim 1, wherein step (b) is omitted when boric anhydride is used instead of boric acid.

5. The process of claim 1, wherein in step (a) boric acid and crude boron nitride are mixed in a weight ratio of 1 to 1.1 and in step (e) the nitriding is at a temperature of about 750° to form a crude, containing at least 65% boron nitride.

6. A process for producing boron nitride which sequentially comprises
   (a) mixing anhydrous borate with recycled boron nitride from a subsequent step in a weight ratio from 1:1 to 1:0.3,
   (b) heating the mixture at a temperature of 300–400° C. to yield a heated mixture wherein the borate hydrate is transformed into boron anhydride,
   (c) crushing and grinding the heated mixture to a powder with a particle size less than 0.1 mm.,
   (d) nitriding the powder in an ammonia current at a temperature of 800–1200° C. to form crude boron nitride,
   (e) crushing and grinding the crude boron nitride to a particle size less than 0.1 mm.,
   (f) recycling a portion of the ground crude boron nitride of (e) to (a),
   (g) leaching with water the remaining portion of the ground crude boron nitride of (e), and
   (h) calcining the leached product in a furnace under nitrogen at a temperature of 1600 to 2000° C.

7. The process of claim 6, wherein the ratio in (a) is 1:0.5 and the calcining in (h) is at 1800° C.

8. The process of claim 6, wherein step (b) is omitted when anhydrous borate is used instead of borate hydrate.

References Cited

UNITED STATES PATENTS

| | | | |
|---|---|---|---|
| 2,808,314 | 10/1957 | Taylor | 23—191 |
| 3,058,809 | 10/1962 | Taylor | 23—191 |
| 3,208,824 | 9/1965 | Lipp | 23—191 |

FOREIGN PATENTS

| | | |
|---|---|---|
| 589,402 | 12/1959 | Canada. |
| 483,201 | 3/1938 | Great Britain. |
| 777,000 | 6/1957 | Great Britain. |
| 990,652 | 4/1965 | Great Britain. |

EARL C. THOMAS, *Primary Examiner.*

G. O. PETERS, *Assistant Examiner.*